(12) United States Patent
Balaraman et al.

(10) Patent No.: US 11,941,627 B2
(45) Date of Patent: Mar. 26, 2024

(54) TRANSACTION AUTHORIZATION PROCESS USING BLOCKCHAIN

(71) Applicant: American Express Travel Related Services Company, Inc., New York, NY (US)

(72) Inventors: Balaji Balaraman, Bangalore (IN); Andras L. Ferenczi, Peoria, AZ (US); Sathish B. Muthukrishnan, Phoenix, AZ (US); Harish R. Naik, Phoenix, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

(21) Appl. No.: 17/703,623

(22) Filed: Mar. 24, 2022

(65) Prior Publication Data

US 2022/0215389 A1 Jul. 7, 2022

Related U.S. Application Data

(62) Division of application No. 15/824,513, filed on Nov. 28, 2017, now abandoned.

(51) Int. Cl.
*G06Q 20/40* (2012.01)
*G06F 16/23* (2019.01)
(Continued)

(52) U.S. Cl.
CPC ......... *G06Q 20/401* (2013.01); *G06Q 20/102* (2013.01); *G06Q 20/36* (2013.01);
(Continued)

(58) Field of Classification Search
None
See application file for complete search history.

(56) References Cited

U.S. PATENT DOCUMENTS

| | | |
|---|---|---|
| RE40,444 E | 7/2008 | Linehan |
| 9,849,364 B2 | 12/2017 | Tran et al. |

(Continued)

OTHER PUBLICATIONS

R. AlTawy, M. ElSheikh, A. M. Youssef and G. Gong, "Lelantos: A Blockchain-Based Anonymous Physical Delivery System," 2017 15th Annual Conference on Privacy, Security and Trust (PST), 2017, pp. 15-1509, doi: 10.1109/PST.2017.00013. (Year: 2017).*

(Continued)

*Primary Examiner* — Jacob C. Coppola
*Assistant Examiner* — Eduardo Castilho
(74) *Attorney, Agent, or Firm* — Thomas Horstemeyer, LLP

(57) ABSTRACT

Systems and methods for transaction authorizations using a distributed database are disclosed. The system may allow registered transaction account holders and merchants to interact and complete transactions according to workflows enforced by smart contracts. The system may include an issuer system that receives a transaction authorization request comprising a merchant ID, a transaction account number, a transaction amount, and a transaction ID. The issuer system may retrieve a merchant public key and a smart contract based on the merchant ID, and a user public key based on the transaction account number. The issuer system may invoke the smart contract by passing the user public key and the transaction ID to the smart contract. The system may propagate transaction data (e.g., the merchant ID, the transaction account number, the payment amount, a transaction status, etc.) to a blockchain network for writing to a blockchain according to the invoked smart contract.

16 Claims, 7 Drawing Sheets

(51) Int. Cl.
 *G06Q 20/10* (2012.01)
 *G06Q 20/36* (2012.01)
 *G06Q 20/38* (2012.01)
 *H04L 9/30* (2006.01)
 *H04L 9/32* (2006.01)
 *H04L 9/40* (2022.01)
 *H04L 9/00* (2022.01)

(52) U.S. Cl.
 CPC ............ *G06Q 20/389* (2013.01); *H04L 9/30* (2013.01); *H04L 9/3239* (2013.01); *H04L 9/3297* (2013.01); *H04L 63/0428* (2013.01); *G06F 16/2379* (2019.01); *G06Q 2220/00* (2013.01); *H04L 9/50* (2022.05); *H04L 2209/56* (2013.01)

(56) References Cited

U.S. PATENT DOCUMENTS

| | | | |
|---|---|---|---|
| 10,521,780 B1* | 12/2019 | Hopkins, III | G06Q 20/12 |
| 10,601,585 B1* | 3/2020 | Robinson | H04L 9/3239 |
| 10,803,451 B2 | 10/2020 | Peikert et al. | |
| 10,871,948 B1* | 12/2020 | Dowling | G06Q 20/02 |
| 2013/0117087 A1 | 5/2013 | Coppinger | |
| 2016/0292680 A1 | 10/2016 | Wilson, Jr. et al. | |
| 2016/0342978 A1 | 11/2016 | Davis et al. | |
| 2016/0342989 A1 | 11/2016 | Davis | |
| 2016/0345978 A1 | 12/2016 | Cruise et al. | |
| 2017/0039330 A1 | 2/2017 | Tanner, Jr. et al. | |
| 2017/0048209 A1 | 2/2017 | Lohe et al. | |
| 2017/0091740 A1 | 3/2017 | Enomoto et al. | |
| 2017/0091750 A1 | 3/2017 | Maim | |
| 2017/0109735 A1 | 4/2017 | Sheng et al. | |
| 2017/0109748 A1* | 4/2017 | Kote | G06Q 40/12 |
| 2017/0178127 A1 | 6/2017 | Kravitz | |
| 2017/0230189 A1 | 8/2017 | Toll et al. | |
| 2017/0237554 A1 | 8/2017 | Jacobs et al. | |
| 2017/0352027 A1 | 12/2017 | Zhang et al. | |
| 2017/0372300 A1 | 12/2017 | Dunlevy et al. | |
| 2018/0006826 A1 | 1/2018 | Smith et al. | |
| 2018/0025442 A1 | 1/2018 | Isaacson et al. | |
| 2018/0068130 A1 | 3/2018 | Chan et al. | |
| 2018/0075453 A1 | 3/2018 | Durvasula et al. | |
| 2018/0082296 A1 | 3/2018 | Brashers | |
| 2018/0096349 A1 | 4/2018 | Mcdonald et al. | |
| 2018/0109516 A1 | 4/2018 | Song et al. | |
| 2018/0123779 A1* | 5/2018 | Zhang | G06Q 20/02 |
| 2018/0197173 A1 | 7/2018 | Durvasula et al. | |
| 2018/0205555 A1* | 7/2018 | Watanabe | H04L 9/3226 |
| 2018/0330343 A1* | 11/2018 | Gray | G06Q 20/065 |
| 2018/0343114 A1 | 11/2018 | Ben-Ari | |
| 2019/0034402 A1* | 1/2019 | Anderson | G06Q 40/03 |
| 2019/0081796 A1 | 3/2019 | Chow et al. | |
| 2019/0108140 A1* | 4/2019 | Deshpande | G06Q 20/3829 |
| 2019/0164157 A1* | 5/2019 | Balaraman | G06Q 20/3823 |
| 2019/0303920 A1 | 10/2019 | Balaraman et al. | |
| 2019/0385215 A1 | 12/2019 | Ferenczi et al. | |
| 2020/0042960 A1 | 2/2020 | Cook et al. | |
| 2020/0042971 A1 | 2/2020 | Eby et al. | |
| 2020/0234386 A1 | 7/2020 | Blackman et al. | |
| 2023/0081152 A1* | 3/2023 | Blazevige | G06Q 20/20 705/42 |

OTHER PUBLICATIONS

P.-W. Chen, B.-S. Jiang and C.-H. Wang, "Blockchain-based payment collection supervision system using pervasive Bitcoin digital wallet," 2017 IEEE 13th International Conference (WiMob), 2017, pp. 139-146, doi: 10.1109/WiMOB.2017.811584 (Year: 2017).*

Clack et al. "Smart Contract Templates: foundations, design landscape and research directions," Computers and Society (cs.CY), 2017, arXiv:1608.00771 [cs.CY] (Year: 2017).*

Aitawy et al., "Lelantos: A Blockchain-Based Anonymous Physical Delivery System," 15th Annual Conference on Privacy, Security and Trust (PST), 2017, pp. 15-24.

Chen et al., "Blockchain-based payment collection supervision system using pervasive Bitcoin digital wallet," IEEE 13th International Conference on Wireless and Mobile Computing, Networking and Communications (WiMob), 2017, pp. 139-146.

Final Office Action in U.S. Appl. No. 15/266,350, dated Sep. 11, 2019, 15 pages.

International Search Report and Written Opinion in PCT/US2018/059670, dated Jan. 25, 2019, 13 pages.

Non-Final Office Action in U.S. Appl. No. 15/266,350, dated May 13, 2019, 12 pages.

White, Ron, "How Computers Work," 7th Edition, Indianapolis, Que Publishing, Oct. 2003, pp. 1-23.

* cited by examiner

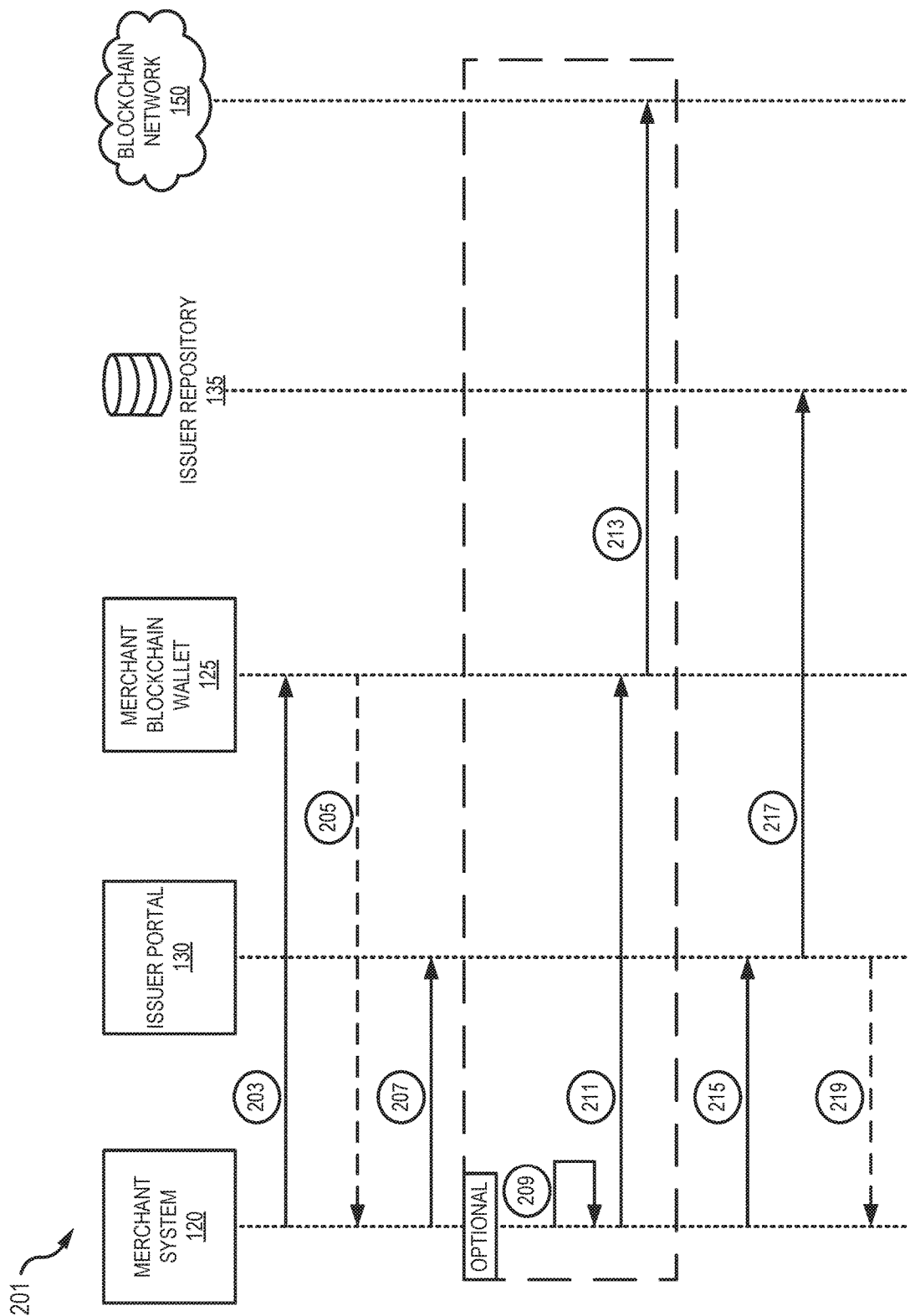

TRANSACTION AUTHORIZATION PROCESS USING BLOCKCHAIN

CROSS-REFERENCE TO RELATED APPLICATIONS

This application is a divisional of copending U.S. patent application Ser. No. 15/824,513, entitled TRANSACTION AUTHORIZATION PROCESS USING BLOCKCHAIN and filed on Nov. 28, 2017, which is incorporated by reference as if set forth herein in its entirety.

FIELD

This disclosure generally relates to transaction authorizations and payments, and more particularly, to systems and methods for transaction authorizations, payments, and related processes using a distributed database.

BACKGROUND

Payment networks typically implement various systems for processing transactions between merchants and customers. Merchants are members of the payment network and the merchants may be authorized to charge to customer accounts. Customers have a transaction account with the payment network. To complete a transaction, a merchant typically transmits a payment request (or settlement) to the payment network with transaction details and the card member's account information. Typically, the payment network authorizes the payment request by assessing a transaction risk and/or debiting the transaction account. Moreover, parties in the transaction may agree to a contract as part of the transaction. For example, the parties may agree to a product or service warranty, a return policy, a disclaimer, a payment schedule, a refund policy, etc.

Payment networks typically face increased costs and limitations associated with the traditional payment model. The payment network implements secure protocols for handling the payment requests, and such secure protocols along with network infrastructure are costly to develop and maintain. The high network costs also may result in high fees charged to merchants using the payment network. Additional programs supported by the payment network such as, for example, storing and maintaining the additional payment contracts for merchant and/or customer review, may further increase costs associated with security and infrastructure.

SUMMARY

A system, method, and computer readable medium (collectively, the "system") is disclosed for a transaction authorization process using blockchain. The system may receive a transaction authorization request comprising a merchant ID, a transaction account number, a transaction amount, and a transaction ID. The system may retrieve a merchant public key and a smart contract based on the merchant ID, and a user public key based on the transaction account number. The system may invoke the smart contract by passing the user public key and the transaction ID to the smart contract. The system may propagate the merchant ID, the transaction account number, the payment amount, and a transaction status to a blockchain network for writing to a blockchain according to the invoked smart contract.

In various embodiments, the merchant public key and the user public key comprise blockchain addresses. A merchant system may be configured to request the merchant public key and a merchant private key from a merchant blockchain wallet. The smart contract may be selected by the merchant system and deployed to the blockchain. The merchant system may be configured to transmit the merchant ID, the merchant public key, and the smart contract to the issuer system to register a merchant-to-smart contract relationship. The selected smart contract may be generated based on input from a merchant regarding a proposed good or service. The invoked smart contract may be secured using the merchant private key. A user device may be configured to request the user public key and a user private key from a user blockchain wallet, and transmit the transaction account number and the user public key to the issuer system to register a user-to-blockchain relationship. The smart contract may comprise a return policy, a refund policy, a partial payment schedule, a full payment workflow, a service deployment schedule, or a product delivery schedule.

In various embodiments, a merchant system in electronic communication with a merchant blockchain wallet may request a merchant public key and a merchant private key from the merchant blockchain wallet. The merchant system may select a smart contract. The merchant system may deploy the smart contract to a blockchain. The merchant system may transmit the merchant ID, the merchant public key, and the smart contract to the issuer system to register a merchant-to-smart contract relationship In various embodiments, the selected smart contract may be generated based on Input regarding a proposed good or service. The invoked smart contract may be secured using the merchant private key. In various embodiments, the merchant system may also transmit a transaction authorization request comprising a merchant ID, a transaction account number, a transaction amount, and a transaction ID to an issuer system. The issuer system may be configured to retrieve the merchant public key based on the merchant ID, the smart contract based on the merchant ID, and a user public key based on the transaction account number; invoke the smart contract by passing the user public key and the transaction ID to the smart contract; and propagate the merchant ID, the transaction account number, the payment amount, and a transaction status to a blockchain network for writing to a blockchain according to the invoked smart contract. The merchant public key and the user public key may comprise blockchain addresses. The selected smart contract comprises a return policy, a refund policy, a partial payment schedule, a full payment workflow, a service deployment schedule, or a product delivery schedule.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION

The subject matter of the present disclosure is particularly pointed out and distinctly claimed in the concluding portion of the specification. However, a more complete understanding of the present disclosure may be obtained by referring to the detailed description and claims when considered in connection with the drawing figures, wherein like numerals denote like elements.

FIGS. 2A and 2B illustrate a process flow for merchant registration in a transaction authorization blockchain system, in accordance with various embodiments;

DETAILED DESCRIPTION

Figure 1:
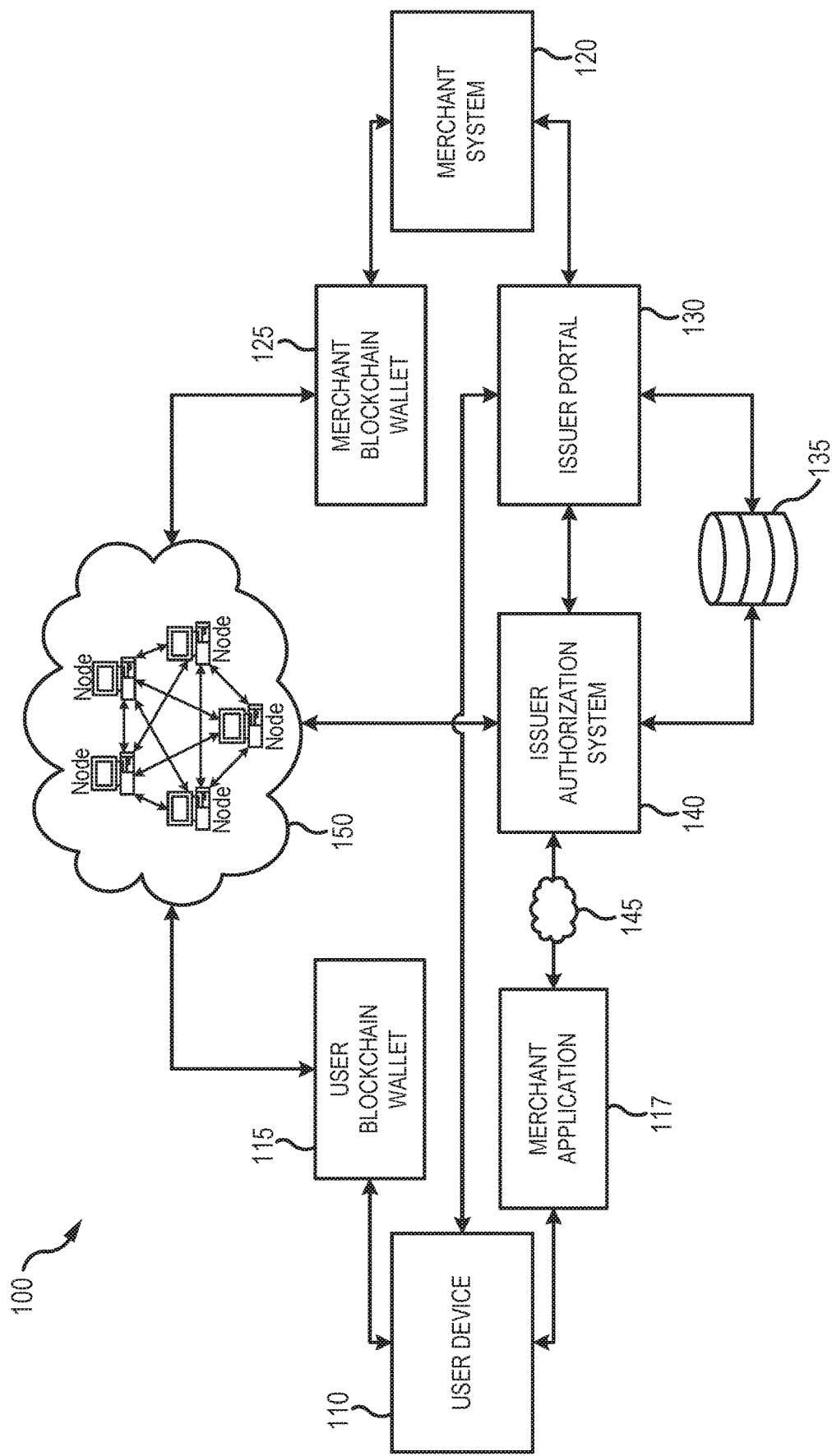
FIG. 1 illustrates an exemplary transaction authorization blockchain system, in accordance with various embodiments.

The detailed description of various embodiments refers to the accompanying drawings, which show various embodiments by way of illustration. While these various embodiments are described in sufficient detail to enable those skilled in the art to practice the disclosure, it should be understood that other embodiments may be realized and that logical and physical changes may be made without departing from the spirit and scope of the disclosure. Thus, the detailed description is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Typical transactions involve an interaction between a buyer (e.g., customer) and a seller (e.g., service provider, merchant, etc.). Transactions may be accompanied by a contractual agreement between the parties, such as, for example, a warranty, a return policy, follow-up services, payment schedules, or the like. As discussed further herein, the system may facilitate creation and use of smart contracts that record the transactions and contractual agreements on an immutable ledger, facilitate workflow, and provide additional services including reputation ledgers. In that regard, the system may be more convenient for customers (e.g., customers no longer need to keep receipts, warranty paperwork, etc.), and may partially reduce disputes due to misunderstandings or dishonest behaviors.

The system may employ a traditional account payment network to facilitate purchases and payments, authorize transactions, and settle transactions. For example, the traditional account payment network may represent existing proprietary networks that presently accommodate transactions for credit cards, debit cards, and/or other types of transactional instruments. The traditional account payment network may comprise an exemplary transaction network such as American Express®, VisaNet®, Mastercard®, Discover®, Interac®, Cartes Bancaires, JCB®, private networks (e.g., department store networks), and/or any other payment network.

The system may use a distributed ledger, which may be based on a blockchain and may have consensus-based transaction validation. Such distributed ledger may also enable smart contracts that enforce business workflows in a decentralized manner and keep track of account balances, proof of purchases, related contracts, and the like. The system may also enable reputation based smart contracts that act as a directory of trustworthy entities as part of the network. The system may also include digital wallet services deployed on user devices such as, for example, computers, tablets, smartphones, Internet of Things devices (IoT devices), etc. Anyone can participate in the traditional account payment network, but in various embodiments, only users (e.g., merchants and transaction account holders) that register with the managing organization(s) may interact with smart contracts to autonomously manage workflows associated with contractual agreements, as described in greater detail herein.

The system further improves the functioning of the computer and/or networked environment. For example, by automating and providing instant or near-instant transaction authorization and storage of related transaction contracts (as opposed to needing a user, third party, or the like to provide transaction authorization and storage of related transaction contracts), the user performs less computer functions and provides less input, which saves on data storage and memory, thus speeding processing in the computer and/or networked environment.

As used herein "electronic communication" means communication of at least a portion of the electronic signals with physical coupling (e.g., "electrical communication" or "electrically coupled") and/or without physical coupling and via an electromagnetic field (e.g., "inductive communication" or "inductively coupled" or "inductive coupling"). As used herein, "transmit" may include sending at least a portion of the electronic data from one system component to another (e.g., over a network connection). Additionally, as used herein, "data," "information," or the like may include encompassing information such as commands, queries, files, data for storage, and the like in digital or any other form.

With reference to FIG. 1, a transaction authorization blockchain system 100 is depicted according to various embodiments. System 100 may include various computing devices, software modules, networks, and data structures in communication with one another. System 100 may also contemplate uses in association with web services, utility computing, pervasive, and individualized computing, security and identity solutions, autonomic computing, cloud computing, commodity computing, mobility and wireless solutions, open source, biometrics, grid computing and/or mesh computing. System 100 based on a blockchain, as described herein, may simplify and automate transaction authorizations and related processes by using the blockchain as a distributed and tamper-proof data store. Transparency is very high for various embodiments using a consortium or public blockchain since validation is performed, for example, using data stored by a decentralized autonomous organization (DAO) instead of a specific financial institution.

System 100 may comprise a blockchain network 150 that operates on a blockchain, in accordance with various embodiments. Blockchain network 150 may be a distributed database that maintains records in a readable manner and that is resistant to tampering. The blockchain may comprise a system of blocks containing data that are interconnected by reference to the previous block. The blocks can hold file transfer data, smart contract data, and/or other information as desired. Each block may link to the previous block and may include a timestamp. When implemented in support of system 100, the blockchain may serve as an immutable, log for transactions and related contracts and processes. Blockchain network 150 may be a peer-to-peer network that is private, consortium and/or public in nature (e.g. Ethereum, Bitcoin, etc.). Consortium and private networks may offer improved control over the content of the blockchain and public networks may leverage the cumulative computing power of the network to improve security. In that regard, blockchain network 150 may be implemented using technologies such as, for example, Ethereum GETH, eth-lightwallet, or other suitable or future blockchain interface technologies.

In various embodiments, blockchain network 150 may comprise various blockchain nodes (e.g., consensus participants) configured to maintain the blockchain. Each blockchain node may comprise a computing device configured to validate blocks of the blockchain. The computing devices may take the form of a computer or processor, or a set of computers and/or processors, although other types of computing units or systems may also be used. Exemplary computing devices include servers, pooled servers, laptops, notebooks, hand held computers, personal digital assistants, cellular phones, smart phones (e.g., iPhone®, BlackBerry®, Android®, etc.) tablets, wearables (e.g., smart watches and smart glasses), Internet of things (IOT) devices or any other device capable of receiving data over network. Each computing device may run applications to interact with blockchain network 150, communicate, with other devices, perform crypto operations, and otherwise operate within system 100. Computing devices may run a client application that can be a thin client (web) based, hybrid (i.e. web and native, such as iOS and Android), or native application to make API calls to interact with the blockchain.

In various embodiments, system 100 may use a Hierarchical Deterministic (HD) solution and may use BIP32, BIP39, and/or BIP44, for example, to generate an HD tree of public addresses. System 100 may include various computing devices configured to interact with blockchain network 150 either via a blockchain client, such as GETH, or via API calls using a blockchain as a service provider, such as MICROSOFT AZURE® or Blockapps STRATO, for example. The various computing devices of system 100 may be configured to store transaction data and execute smart contracts using blockchain network 150 for data storage and/or validation. The smart contracts may be completed by digital signature using asymmetric crypto operations and a private key, for example, and as discussed further herein.

In various embodiments, system 100 may comprise a user device 110. User device 110 may comprise any suitable combination of hardware and/or software and may be a computing device such as a server, laptop, notebook, hand held computer, personal digital assistant, cellular phone, smart phone (e.g., iPhone®, BlackBerry®, Android®, etc.) tablet, wearable (e.g., smart watches, smart glasses, smart rings, etc.), Internet of things (IoT) device, smart speaker, or any other similar device. User device 110 may comprise software configured to aid user device 110 in interacting with components of system 100. For example, user device 110 may comprise a user blockchain wallet 115 and/or a merchant application 117.

User device 110 may be in electronic communication with blockchain network 150 via user blockchain wallet 115. User blockchain wallet 115 may comprise any suitable distributed-ledger based wallet that allows for the installation of smart contracts, such as, for example, Ethereum GETH, eth-lightwallet, and/or any other suitable blockchain interface technologies. User blockchain wallet 115 may serve as a blockchain interface accessible by applications installed on user device 110. For example, user blockchain wallet 115 may be configured to register user device 110 with the blockchain, write data to the blockchain according to a smart contract, write transaction data to the blockchain, and request public key (e.g., blockchain address) and private key pairs from blockchain network 150, as discussed further herein.

User device 110 may be in electronic communication with issuer authorization system 140 via merchant application 117 and transaction network 145. Merchant application may comprise software, a mobile application, a web interface, or the like accessible from user device 110. Merchant application 117 may allow a user, via user device 110, to browse, interact with, and purchase physical goods, digital goods, services, or the like from a merchant. In that regard, merchant application 117 may be in electronic communication with merchant system 120, and/or may be hosted on merchant system 120 and accessible via user device 110. Transaction network 145, which may be part of certain transactions, represents existing proprietary networks that presently accommodate transactions for credit cards, debit cards, and/or other types of transactional instruments. Transaction network may be a closed network that is secure from eavesdroppers. In various embodiments, transaction network 145 may comprise an exemplary transaction network such as American Express®, VisaNet®, Mastercard®, Discover®, Interac®, Cartes Bancaires, JCB®, private networks (e.g., department store networks), and/or any other payment network.

In various embodiments, issuer authorization system 140 may be configured as a central hub to access various systems, engines, and components of a payment network, as discussed further herein. Issuer authorization system 140 may comprise one or more of a server, computing device, data structure or the like, and may be in electronic and/or operative communication with issuer portal 130, issuer repository 135, transaction network 145, and/or blockchain network 150. Issuer authorization system 140 may be configured to authorize and settle payment transactions; maintain transaction account member databases, accounts receivable databases, accounts payable databases, or the like; retrieve and invoke smart contracts from issuer repository 135; and/or additional processing tasks as described further herein.

Issuer repository 135 may be in electronic communication with issuer authorization system 140 and/or issuer portal 130, and may comprise any suitable data structure. Issuer repository 135 may be configured to store smart contracts, merchant-to-smart contract relationships, and user-to-blockchain relationships. The smart contracts may be related to the transaction process. For example, issuer repository 135 may store smart contracts configured to control the end-to-end flow of return policies, refund policies, partial payment workflows, full payment workflows, payment schedules, service deployment schedules, and/or the like. Each smart contract may be an executable that writes data to the blockchain in a predetermined format based on predetermined function parameters passed by an API call. The smart contracts may take as an input the fields included for writing during the transaction authorization process, such as, for example, a user ID, a merchant ID, transaction data (e.g., payment amount, etc.), public keys, or the like. Each smart contract may include a program written in a programming language such as, for example, Solidity, or any other suitable programming language.

In various embodiments, system 100 may comprise an issuer portal 130 configured as an interface for access to issuer authorization system 140 and issuer repository 135. Issuer portal 130 may comprise any suitable combination of software and/or hardware, such as a website or application installed on issuer authorization system 140 and/or merchant system 120. For example, issuer portal 130 may allow a merchant via merchant system 120 to browse issuer repository 135 to select a smart contract, as discussed further herein. Issuer portal 130 may also allow a merchant via merchant system 120 to register for system 100, such as, for example, by receiving a merchant public key (e.g., the blockchain address of merchant blockchain wallet 125), a merchant ID, and the selected smart contract.

In various embodiments, merchant system 120 may be configured to allow a merchant access to system 100. Merchant system 120 may comprise any suitable combination of hardware and/or software, and may comprise one or more of a server, computing device, data structure or the like.

Merchant system 120 may comprise software configured to aid merchant system 120 in interacting with components of system 100. For example, merchant system 120 may comprise a merchant blockchain wallet 125. Merchant blockchain wallet 125 may comprise any suitable distributed-ledger based wallet that allows for the installation of smart contracts, such as, for example, Ethereum GETH, eth-lightwallet, and/or any other suitable blockchain interface technologies. Merchant blockchain wallet 125 may be configured as a blockchain interface accessible by merchant system 120 to provide access to blockchain network 150. For example, merchant blockchain wallet 125 may be configured to register merchant system 120 with the blockchain write data to the blockchain according to a smart contract, write transaction data to the blockchain, and request public key (e.g., blockchain address) and private key pairs from blockchain network 150, as discussed further herein.

The various electronic communications of system 100 including the registration requests, transaction processes, writing to blockchain network 150, and/or reading data from blockchain network 150 may be accomplished using a network. As used herein, the term "network" includes any cloud, cloud computing system or electronic communications system or method that incorporates hardware and/or software components. Communication among the parties may be accomplished through any suitable communication channels, such as, for example, a telephone network, an extranet, an intranet, Internet, point of interaction device (point of sale device, personal digital assistant, cellular phone, kiosk, tablet, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, AppleTalk, IP-6, NetBIOS, OSI, any tunneling protocol (e.g., IPsec, SSH, etc.), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998), JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

A network may be unsecure. Thus, communication over the network may utilize data encryption. Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptosystems. Asymmetric encryption in particular may be of use in signing and verifying signatures for blockchain crypto operations.

Referring now to FIGS. 2A-4B, the process flows depicted are merely embodiments and are not intended to limit the scope of the disclosure. For example, the steps recited in any of the method or process descriptions may be executed in any order and are not limited to the order presented. It will be appreciated that the following description makes appropriate references not only to the steps depicted in FIGS. 2-4B, but also to the various system components as described above with reference to FIG. 1.

Figure 2B:
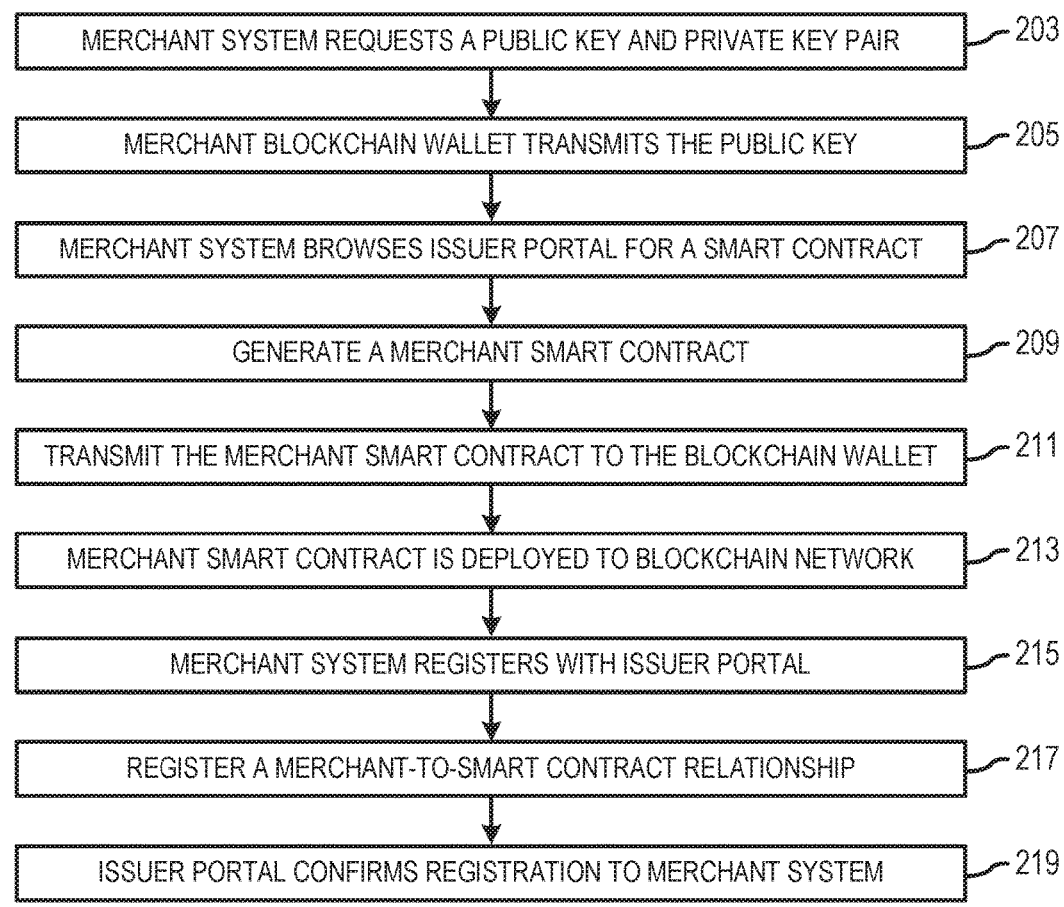

With specific reference to FIGS. 2A and 2B, and continued reference to FIG. 1, a process 201 for merchant registration in a transaction authorization blockchain system is shown according to various embodiments. Merchant system 120 requests a public key and private key pair (step 203). Merchant system 120 may request the asymmetric key pair from merchant blockchain wallet 125 to begin the merchant registration process. Merchant blockchain wallet 125 may generate and/or receive the asymmetric key pair, including the private key (e.g., merchant private key) paired with the public key (e.g., merchant public key). The public key and the private key may be generated using any suitable technique, such as BIP32, BIP39, BIP44 or the like. The public key may comprise a blockchain address. Merchant blockchain wallet 125 may encrypt and store the private key. Merchant blockchain wallet 125 transmits the public key to merchant system 120 (step 205). Merchant system 120 may encrypt and store locally the public key.

Merchant system 120 browses issuer portal 130 for a smart contract (step 207). Issuer portal 130 may display, via merchant system 120, one or more smart contracts for the merchant to select. In response to locating a desired or suitable smart contract, the merchant via merchant system 120 may select the smart contract. In response to the merchant being unable to locate a desirable smart contract to select, merchant system 120 may interact with issuer portal 130 to generate a merchant smart contract (step 209). For example, in response to being unable to locate a useful or desirable smart contract, the merchant may desire to generate a merchant smart contract to meet its needs (e.g., to generate a new smart contract based on a proposed good or service to be sold). Issuer portal 130, via merchant system 120, may display an interface to the merchant with available selections to generate the merchant smart contract. For example, issuer portal 130 may display various smart contract templates (e.g., warranty, payment schedule, merchant rating/reputation, etc.) and the merchant may selected desired options for each template. In various embodiments, issuer portal 130 may also allow a merchant to upload a created smart contract that was programmed using any suitable blockchain programming language, such as, for example, Solidity. Issuer portal 130 may generate the merchant smart contract based on the merchant's selection, and transmit the merchant smart contract to merchant system 120. Merchant system 120 transmits the merchant smart contract to merchant blockchain wallet 125 (step 211). The merchant smart contract is deployed to blockchain network 150 (step 213). Merchant blockchain wallet 125 may deploy/write the merchant smart contract (or invoke an API to perform the write), to blockchain network 150.

Merchant system 120 registers with issuer portal 130 (step 215). Merchant system 120 may transmit a merchant registration request to issuer portal 130. The merchant registration request may comprise a merchant ID, the public key received in step 205, and the selected smart contract from step 207. In various embodiments, each merchant may comprise a plurality of merchant IDs. In that regard, merchant system 120 may register multiple merchant ID's, with each merchant ID being linked to a different selected smart contract. For example, a merchant selling both digital products and physical products may assign different merchant ID's to the digital products and physical products to allow different smart contracts to be employed. In response to merchant system 120 optionally generating the merchant smart contract (e.g., during step 209 through step 213), the merchant registration request may comprise the merchant smart contract and/or the blockchain address of the deployed merchant smart contract to the blockchain. Issuer portal 130 registers a merchant-to-smart contract relationship in issuer repository 135 (step 217). Issuer portal 130 may transmit the merchant registration request to issuer repository 135. Issuer repository 135 may store the data using any suitable technique. Issuer portal 130 confirms registration to merchant system 120 (step 219). Issuer portal 130 may transmit a merchant registration confirmation to merchant system 120 to confirm that registration was successful. In response to an error occurring during registration (such as in response to determining a preexisting registration for the same merchant ID). Issuer portal 130 may transmit a merchant registration failure confirmation to merchant system 120 containing data indicating the error that occurred during registration.

Figure 3A:
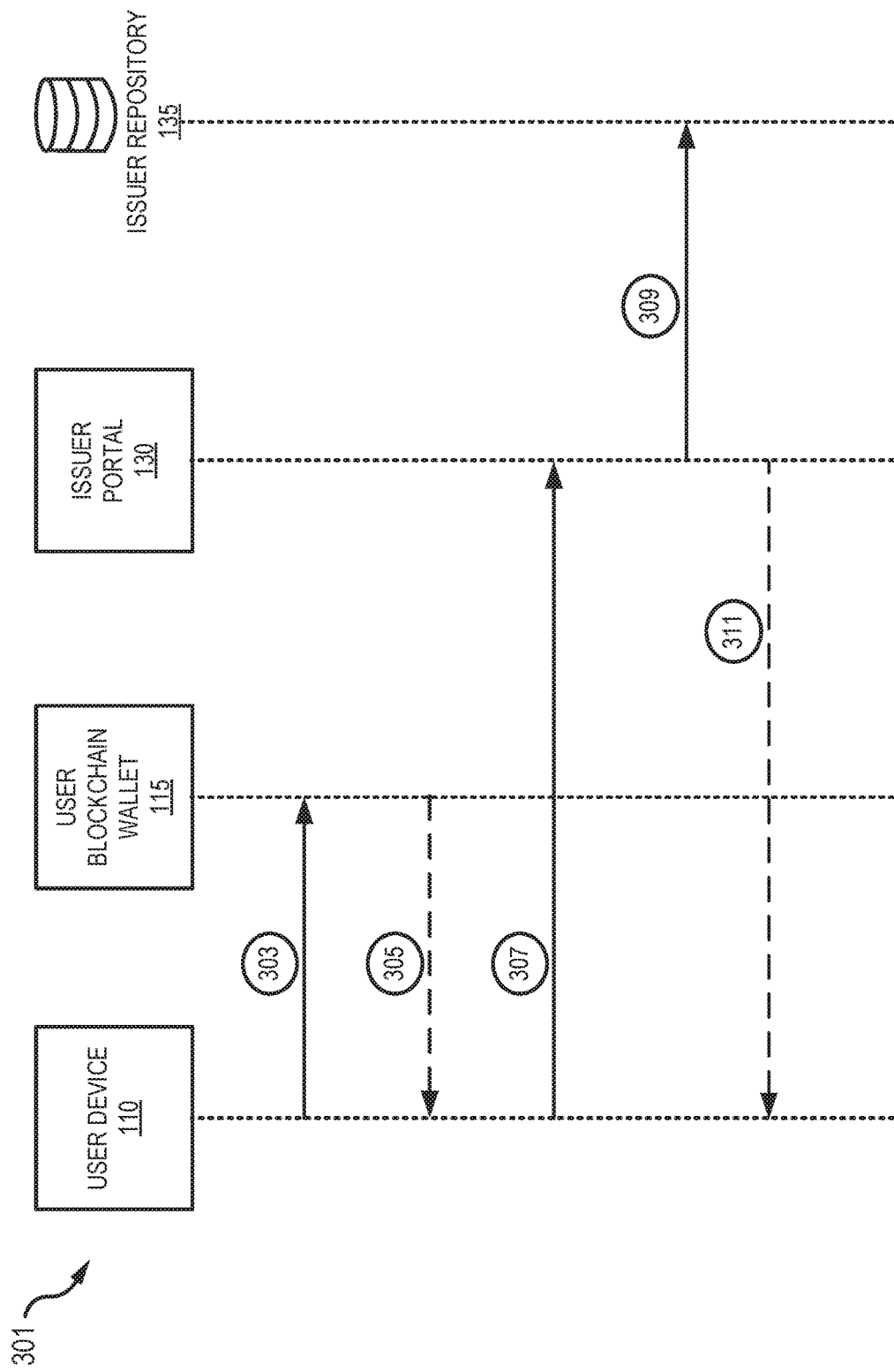
FIGS. 3A and 3B illustrate a process flow for user registration in a transaction authorization blockchain system, in accordance with various embodiments.
Figure 3B:
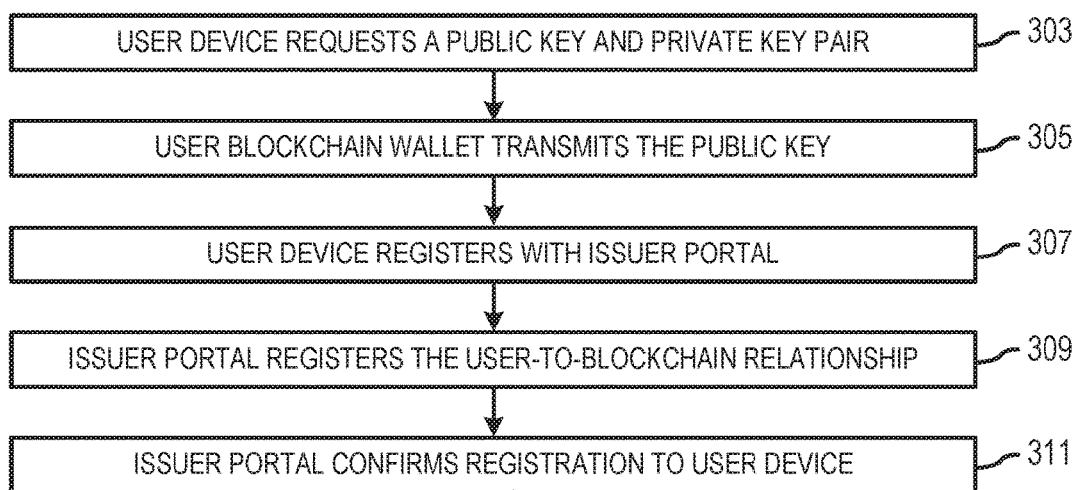

With specific reference to FIGS. 3A and 3B, and continued reference to FIG. 1, a process 301 for user registration in a transaction authorization blockchain system is shown according to various embodiments. User device 110 requests a public key and private key pair (step 303). User device 110 may request the asymmetric key pair from user blockchain wallet 115 to begin the user registration process. User blockchain wallet 115 may generate and/or receive the asymmetric key pair, including the private key (e.g., user private key) paired with the public key (e.g., user public key). The public key and the private key may be generated using any suitable technique, such as BIP32, BIP39, BIP44 or the like. The public key may comprise a blockchain address. User blockchain wallet 115 may encrypt and store the private key. User blockchain wallet 115 transmits the public key to user device 110 (step 305). User device 110 may encrypt and store locally the public key.

User device 110 registers with issuer portal 130 (step 307). User device 110 may transmit a user registration request to issuer portal 130. In various embodiments, issuer portal 130 may prompt user device 110 to enter login credentials (e.g., a username and password, biometric input, etc.) prior to allowing user device 110 to transmit the user registration request to issuer portal 130. The user registration request may comprise a transaction account number and/or the public key received in step 305. In various embodiments wherein the user enters login credentials to issuer portal 130 during the registration process, issuer portal 130 may also be configured to retrieve transaction account information linked to the login credentials. Issuer portal 130 registers the user-to-blockchain relationship in issuer repository 135 (step 309). Issuer portal 130 may transmit the user registration request to issuer repository 135. Issuer repository 135 may store the data using any suitable technique. Issuer portal 130 confirms registration to user device, 110 (step 311). Issuer portal 130 may transmit a user registration confirmation to user device 110 to confirm that registration was successful. In response to an error occurring during registration (such as in response to determining a preexisting registration for the same user), issuer portal 130 may transmit a user registration failure confirmation to user device 110 containing data indicating the error that occurred during registration.

Figure 4A:
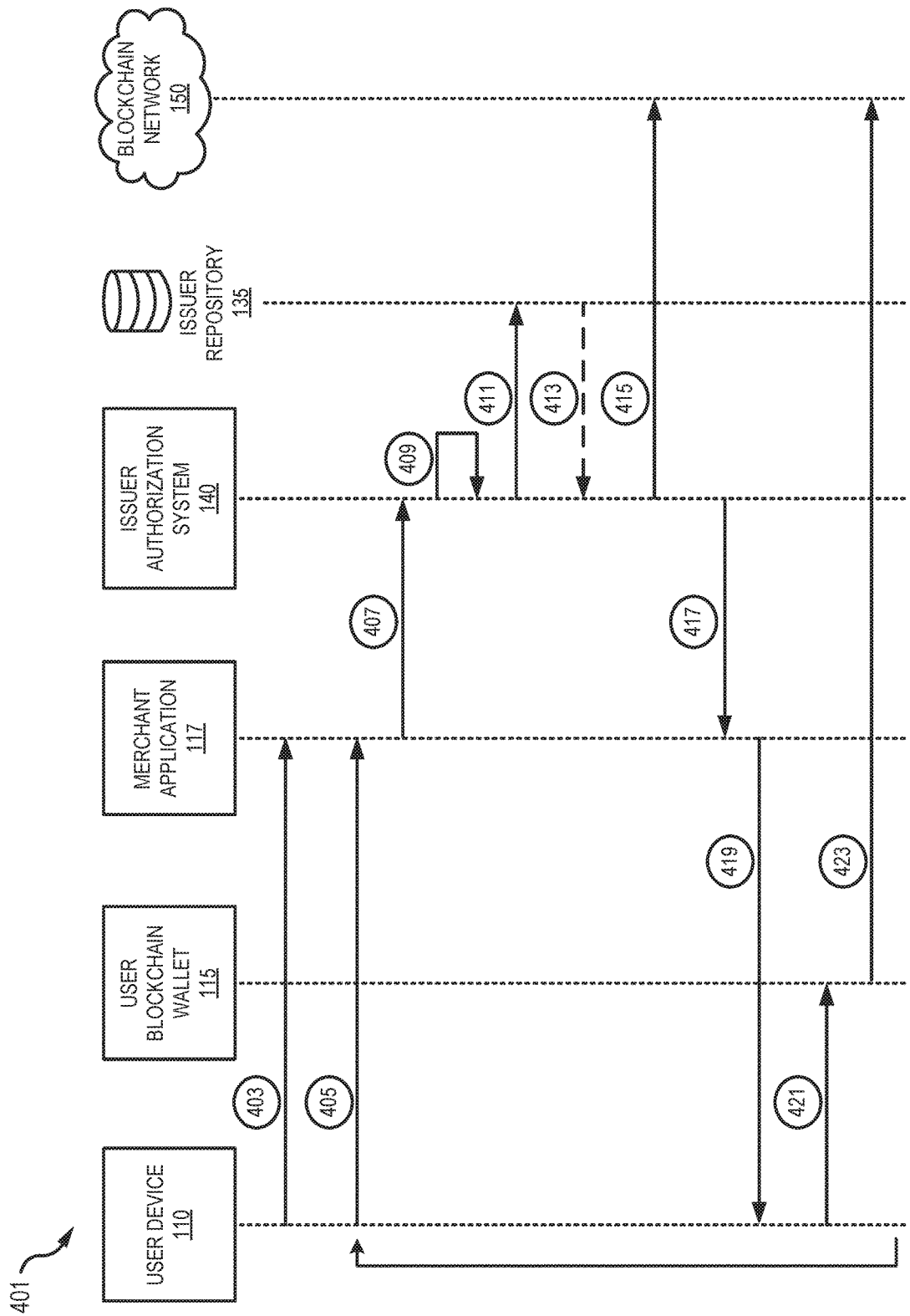
FIGS. 4A and 4B illustrate a transaction authorization process in a transaction authorization blockchain system, in accordance with various embodiments.
Figure 4B:
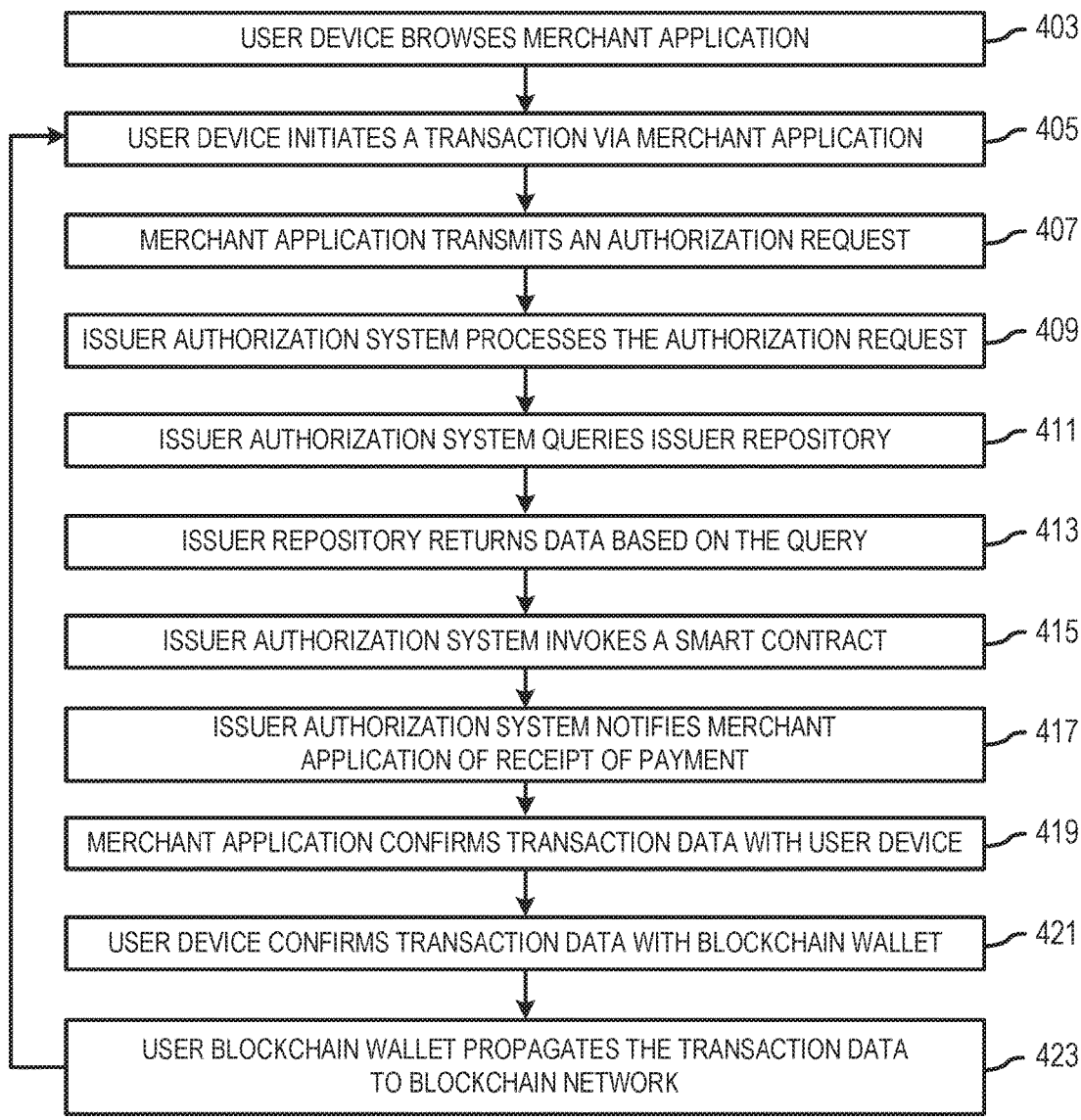

With specific reference to FIGS. 4A and 4B, and continued reference to FIG. 1, a transaction authorization process 401 is shown according to various embodiments. User device 110 browses merchant application 117 (step 403). For example, user device 110 may browse merchant application 117 to purchase a good or service, Merchant application 117 may also display and/or describe associated contracts with each good or service (e.g., return/refund policy, payment installment plan, etc.). User device 110 initiates a transaction via merchant application 117 (step 405). For example, the user may purchase a good or service and select or enter a transaction account number to initiate the transaction. In various embodiments, the transaction may be initiated based on the smart contract selected by the merchant during the merchant registration process 201, with brief reference to FIGS. 2A and 2B.

Merchant application 117 transmits an authorization request (step 407). Merchant application 117 may transmit the authorization request to issuer authorization system 140, via transaction network 145. The authorization request may comprise data regarding the transaction, such as, for example, the merchant ID, the transaction account number, a transaction amount, a transaction ID, or the like. Issuer authorization system 140 processes the authorization request (step 409). Issuer authorization system 140 may process the authorization request using any suitable technique known in the art. For example, issuer authorization system 140 may be configured to validate the authorization request by comparing data from the authorization request to stored transaction account data in an account member database. For example, issuer authorization system 140 may query the account member database and may compare the transaction account numbers, account holder identifying information, etc. Issuer authorization system 140 may also assess the risk of the transaction. Issuer authorization system 140 may transfer funds or the like to otherwise complete the transaction.

Issuer authorization system 140 queries issuer repository 135 (step 411). Issuer authorization system 140 may query issuer repository to determine the merchant public key and smart contract based on the merchant ID, and/or the user public key based on the transaction account number identified during the purchase transaction. Issuer repository 135 returns data to issuer authorization system 140 based on the query (step 413). For example, issuer repository 135 may return the merchant public key, the smart contract, and the user public key back to issuer authorization system 140. Issuer authorization system 140 invokes the smart contract (step 415). Issuer authorization system 140 may invoke the smart contract returned in step 413 and may pass parameters relating to the transaction, including the user public key, the transaction ID, or the like. The call to the smart contract may be secured using the private key from merchant system 120. The user public key included in the call may be digitally signed using a trusted certificate authority (e.g., VeriSign®, DigiCert®, etc.).

Issuer authorization system 140 notifies merchant application 117 of receipt of the payment (step 417). For example, the smart contract may transmit via issuer authorization system 140 and transaction network 145 to merchant application 117 a payment receipt comprising data indicating a successfully authorized transaction. Merchant application 117 confirms transaction data with user device 110 (step 419). For example, in response to the transaction comprising a physical or digital good, merchant application 117 may begin the process of delivering the physical or digital good to the user. In response to the transaction comprising a service, merchant application 117 may notify the merchant or third party that the transaction was successful. In response to the transaction including a warranty plan, payment installation plan, or the like, merchant application 117 may confirm the plan with user device 110.

User device 110 confirms transaction data with user blockchain wallet 115 (step 421). For example, in response to the transaction involving a physical or digital good, user device 110 may confirm receipt of the physical or digital good with user blockchain wallet 115. In response to the transaction involving a service, user device 110 may confirm with user blockchain wallet 115 that the service was started, completed, etc. In response to the transaction including a warranty plan, payment installation plan, or the like, user device 110 may confirm the plan with blockchain wallet 115. In various embodiments, user blockchain wallet 115 may invoke the smart contract (e.g., the smart contract retrieved in steps 411 and 413). For example, user blockchain wallet 115 may provide a link to the smart contract blockchain address allowing the user to access the smart contract. In various embodiments, a customer may also interface with user blockchain wallet 115 (e.g., via pasting or inputting the smart contract blockchain address) to access the smart contract.

User blockchain wallet 115 propagates transaction data to blockchain network 150 (step 423). For example, user blockchain wallet 115 may propagate transaction data including the merchant ID, the transaction account number, the payment amount, transaction status (e.g., completed, pending, etc.), and/or the like; data regarding a contractual agreement such as a warranty place, return policy, payment installation policy, or the like; and/or any other data relating to the transaction. User blockchain wallet 115 may propagate the transaction data by writing it to the blockchain or by otherwise transmitting the proposal to other consensus participants in blockchain network 150. The consensus participants may achieve consensus and add a new ledger for the transaction data to the blockchain. The consensus participants may validate the transaction data, and any other activity on the blockchain by establishing consensus between the participants based on proof of work, proof of stake, practical byzantine fault tolerance, delegated proof of stake, or other suitable consensus algorithms. The consensus participants may notify user blockchain wallet 115 of a successful write to the blockchain by transmitting a confirmation, or by user blockchain wallet 115 locating the transaction data written on blockchain. In various embodiments, in response to the smart contract and/or transaction stipulating that the transaction involves multiple payments (e.g., a payment schedule) and/or multiple steps, transaction authorization process 401 may repeat step 405 through step 423.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include, the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy", "meet", "match" "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input and/or any other method known in the art.

As used herein, big data may refer to partially or fully structured, semi-structured, or unstructured data sets including millions of rows and hundreds of thousands of columns. A big data set may be compiled, for example, from a history of purchase transactions over time, from web registrations, from social media, from records of charge (ROC), from summaries of charges (SOC), from internal data, or from other suitable sources. Big data sets may be compiled without descriptive metadata such as column types, counts, percentiles, or other interpretive-aid data points.

A distributed computing duster and/or big data management system may be, for example, a Hadoop® duster configured to process and store big data sets with some of nodes comprising a distributed storage system and some of nodes comprising a distributed processing system. In that regard, distributed computing duster may be configured to support a Hadoop® distributed file system (HDFS) as specified by the Apache Software Foundation at http://hadoop.apache.org/docs/. For more information on big data management systems, see U.S. Ser. No. 14/944,902 titled INTEGRATED BIG DATA INTERFACE FOR MULTIPLE STORAGE TYPES and filed on Nov. 18, 2015; U.S. Ser. No. 14/944,979 titled SYSTEM AND METHOD FOR READING AND WRITING TO BIG DATA STORAGE FORMATS and filed on Nov. 18, 2015; U.S. Ser. No. 14/945,032 titled SYSTEM AND METHOD FOR CREATING, TRACKING AND MAINTAINING BIG DATA USE CASES and filed on Nov. 18, 2015; U.S. Ser. No. 14/944, 849 titled SYSTEM AND METHOD FOR AUTOMATICALLY CAPTURING AND RECORDING LINEAGE DATA FOR BIG DATA RECORDS and filed on Nov. 18, 2015; U.S. Ser. No. 14/944,898 titled SYSTEMS AND METHODS FOR TRACKING SENSITIVE DATA IN A BIG DATA ENVIRONMENT and filed on Nov. 18, 2015; and U.S. Ser. No. 14/944,961 titled SYSTEM AND METHOD TRANSFORMING SOURCE DATA INTO OUTPUT DATA IN BIG DATA ENVIRONMENTS and filed on Nov. 18, 2015, the contents of each of which are herein incorporated by reference in their entirety.

Any communication, transmission and/or channel discussed herein may include any system or method for delivering content (e.g. data, messages, information metadata, etc.), and/or the content itself. The content may be presented in any form or medium, and in various embodiments, the content may be delivered electronically and/or capable of being presented electronically. For example, a channel may comprise a website or device (e.g., FACEBOOK®, YOUTUBE®, APPLE® TV®, PANDORA®, XBOX®, SONY® PLAYSTATION®), a uniform resource locator ("URL"), a document (e.g., a MICROSOFT® Word® document, a MICROSOFT® Excel® document, an ADOBE® .pdf document, etc.), an "ebook," an "emagazine," an application or microapplication (as described herein), an SMS or other type of text message, an email, FACEBOOK® message, TWITTER® tweet and/or message, MMS, and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate, or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result In various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system.

As those skilled in the art will appreciate, user computer may include an operating system (e.g., WINDOWS®, OS2, UNIX® LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations or any of the operations may be conducted or enhanced by Artificial Intelligence (A) or Machine Learning. Useful machines for performing the various embodiments include, general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a magnetic tape drive, an optical disk drive, etc. The removable storage drive reads from and/or writes to a removable storage unit in a well-known manner. Removable storage unit represents a magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data files transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The computer system or any components may integrate with system integration technology such as, for example, the ALEXA system developed by AMAZON®. ALEXA is a cloud-based voice service that can help you with tasks, entertainment, general information and more. All AMAZON® ALEXA devices, such as the AMAZON ECHO®, AMAZON ECHO DOT®, AMAZON TAP®, and AMAZON FIRE® TV, have access to the ALEXA system. The ALEXA system may receive voice commands via its voice activation technology, and activate other functions, control smart devices and/or gather information. For example, music, emails, texts, calling, questions answered, home improvement information, smart home communication/activation, games, shopping, making to-do lists, setting alarms, streaming podcasts, playing audiobooks, and providing weather, traffic, and other real time information, such as news. The ALEXA system may allow the user to access information about eligible accounts linked to an online account across all ALEXA-enabled devices.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEBSPHERE®, WEBLOGIC®, JBOSS®, EDB® Postgres Plus Advanced Server® (PPAS), etc.). In various embodiments, the server may include web servers (e.g. APACHE®, IIS, GWS, SUN JAVA® SYSTEM WEB SERVER, JAVA® Virtual Machine running on LINUX® or WINDOWS®).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MACBOOKS®, kiosks, terminals, point of sale (POS) devices and/or terminals, televisions, or any other device capable of receiving data over a network. A web-client may run MICROSOFT® INTERNET EXPLORER®, MOZILLA® FIREFOX®, GOOGLE® CHROME®, APPLE® Safari, or any other of the myriad software packages available for browsing the Internet.

As those skilled in the art will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., WINDOWS® OS, OS2, UNIX® OS, LINUX® OS, SOLARIS®, MacOS, and/or the like) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® Operating System, APPLE® IOS®, a BLACKBERRY® operating system, and the like. The micro-app may be configured to leverage the resources of the larger operating system and associated hardware via a set of predetermined rules which govern the operations of various operating systems and hardware resources. For example, where a micro app desires to communicate with a device or network other than the mobile device or mobile operating system, the micro-app may leverage, the communication protocol of the operating system and associated device hardware under the predetermined rules of the mobile operating system. Moreover, where the micro-app desires an input from a user, the micro-app may be configured to request a response from the operating system which monitors various hardware components and communicates a detected input from the hardware to the micro-app.

Any databases discussed herein may include relational, hierarchical, graphical, blockchain, or object-oriented structure and/or any other database configurations. The databases may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2 by IBM® (Armonk, N.Y.), various database products available from ORACLE® Corporation (Redwood Shores, Calif.), MICROSOFT® ACCESS® or MICROSOFT® SQL Server® by MICROSOFT® Corporation (Redmond, Wash.), MYSQL® by MySQL AB (Uppsala, Sweden), HBase™ by APACHE®, MapR-DB, or any other suitable database product. Moreover, the databases may be organized in any suitable manner, for example, as data tables or lookup tables. Each record may be a single file, a series of files, a linked series of data fields. or any other data structure.

The blockchain structure may include a distributed database that maintains a growing list of data records. The blockchain may provide enhanced security because each block may hold individual transactions and the results of any blockchain executables. Each block may contain a timestamp and a link to a previous block. Blocks may be linked because each block may include the hash of the prior block in the blockchain. The linked blocks form a chain, with only one successor block allowed to link to one other predecessor block for a single chain. Forks may be possible where divergent chains are established from a previously uniform blockchain, though typically only one of the divergent chains will be maintained as the consensus chain. For more information on blockchain-based payment networks, see U.S. application Ser. No. 15/266,350 titled SYSTEMS AND METHODS FOR BLOCKCHAIN BASED PAYMENT NETWORKS and filed on Sep. 15, 2016, U.S. application Ser. No. 15/682,180 titled SYSTEMS AND METHODS FOR DATA FILE TRANSFER BALANCING AND CONTROL ON BLOCKCHAIN and filed Aug. 21, 2017, and U.S. application Ser. No. 15/728,086 titled SYSTEMS AND METHODS FOR LOYALTY POINT DISTRIBUTION and filed Oct. 9, 2017, the contents of which are each incorporated by reference in their entirety.

Association of certain data may be accomplished through any desired data association technique such as those known or practiced in the art. For example, the association may be accomplished either manually or automatically. Automatic association techniques may include, for example, a database search, a database merge, GREP, AGREP SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary Information can be stored in a storage space associated with a data set. As discussed above, the binary information may be stored in association with the system or external to but affiliated with system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set: e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trader may be received by a standalone interaction device configured to add, delete, modify, or augment the data in accordance with the header or trader. As such, in one embodiment, the header or trailer is not stored on the transaction device along with the associated issuer-owned data but instead the appropriate action may be taken by providing to the user at the standalone device, the appropriate option for the action to be taken. The system may contemplate a data storage arrangement wherein the header or trailer, or header or trader history, of the data is stored on the system, device or transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, GPG (GnuPG), HPE Format-Preserving Encryption (FPE), Voltage, and symmetric and asymmetric cryptosystems. The systems and methods may also incorporate SHA series cryptographic methods as well as ECC (Elliptic Curve Cryptography) and other Quantum Readable Cryptography Algorithms under development.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® web server software, a MICROSOFT® SQL Server database system, and a MICROSOFT® Commerce Server. Additionally, components such as MICROSOFT® ACCESS® or MICROSOFT® SQL Server ORACLE®, SYBASE®, INFORMIX® MySQL, INTERBASE etc., may be used to provide an Active Data Object (ADO) compliant database management system. In one embodiment, the Apache web server is used in conjunction with a Linux operating system, a MYSQL® database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT®, active server pages (ASP), common gateway interface scripts (CGI), extensible markup language (XML), dynamic HTML, cascading style sheets (CSS), AJAX (Asynchronous JAVASCRIPT® And XML), helper applications, plug-ins, and the like. A server may include a web service that receives a request from a web server, the request including a URL and an IP address (e.g., 10.0.0.2). The web server retrieves the appropriate web pages and sends the data or applications for the web pages to the IP address. Web services are applications that are capable of interacting with other applications over a communications means, such as the Internet. Web services are typically based on standards or protocols such as XML, SOAP, AJAX, WSDL and UDDI. Web services methods are well known in the art, and are covered in many standard texts. For example, representational state transfer (REST), or RESTful, web services may provide one way of enabling interoperability between applications.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WEBSPHERE® MQ™ (formerly MQSeries) by IBM®, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, APACHE® Hive, JAVA®, JAVASCRIPT®, VB Script, Macromedia Cold Fusion COBOL, MICROSOFT® Active Server Pages, assembly, PERL, PHP, awk, Python, Visual Basic, SQL Stored Procedures, Spark, Scala, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT®, VBScript or the like. Cryptography and network security methods are well known in the art, and are covered in many standard texts.

In various embodiments, the software elements of the system may also be implemented using Node.js®. Node.js® may implement several modules to handle various core functionalities. For example, a package management module, such as Npm®, may be implemented as an open source library to aid in organizing the installation and management of third-party Node.js® programs. Node.js® may also implement a process manager, such as, for example, Parallel Multithreaded Machine ("PM2"); a resource and performance monitoring tool, such as, for example, Node Application Metrics ("appmetrics"); a library module for building user interfaces, such as for example ReachJS®; and/or any other suitable and/or desired module.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an Internet based embodiment, an entirely hardware embodiment, or an embodiment combining aspects of the Internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, BLU-RAY, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

Referring now to FIGS. 3A-4B, the process flows and screenshots depicted are merely embodiments and are not intended to limit the scope of the disclosure. For example, the steps recited in any of the method or process descriptions may be executed in any order and are not limited to the order presented.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple, steps as illustrated and described may be combined into single webpages and/or WINDOWS® but have been expanded for the sake of simplicity. In other cases, steps Illustrated and described as single process steps may be separated into multiple webpages and/or WINDOWS® but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

The disclosure and claims do not describe only a particular outcome of processing transaction authorizations, payments, and related processes using a distributed database, but the disclosure and claims include specific rues for implementing the outcome of processing transaction authorizations, payments, and related processes using a distributed database, and that render information into a specific format that is then used and applied to create the desired results processing transaction authorizations, payments, and related processes using a distributed database, as set forth in *McRO, Inc.* v. *Bandai Namca Games America Inc.* (Fed. Cir. case number 15-1080, Sep. 13, 2016). In other words, the outcome of processing transaction authorizations, payments, and related processes using a distributed database can be performed by many different types of rules and combinations of rules, and this disclosure includes various embodiments with specific rules. While the absence of complete preemption may not guarantee that a claim is eligible, the disclosure does not sufficiently preempt the field of processing transaction authorizations, payments, and related processes using a distributed database at all. The disclosure acts to narrow, confine, and otherwise tie down the disclosure so as not to cover the general abstract idea of just processing transaction authorizations, payments, and related processes using a distributed database. Significantly, other systems and methods exist for validating and logging API transactions, so a would be inappropriate to assert that the claimed invention preempts the field or monopolizes the basic tools of processing transaction authorizations, payments, and related processes using a distributed database. In other words, the disclosure will not prevent others from processing transaction authorizations, payments, and related processes using a distributed database, because other systems are already performing the functionality in different ways than the claimed invention. Moreover, the claimed invention includes an inventive concept that may be found in the non-conventional and non-generic arrangement of known, conventional pieces, in conformance with *Bascom* v. *AT&T Mobility*, 2015-1763 (Fed. Cir. 2016). The disclosure and claims go way beyond any conventionality of any one of the systems in that the interaction and synergy of the systems leads to additional functionality that is not provided by any one of the systems operating independently. The disclosure and claims may also include the interaction between multiple different systems, so the disclosure cannot be considered an implementation of a generic computer, or just "apply it" to an abstract process. The disclosure and claims may also be directed to improvements to software with a specific implementation of a solution to a problem in the software arts.

In various embodiments, the system and method may include alerting a subscriber when their computer is offline. The system may include generating customized information and alerting a remote subscriber that the information can be accessed from their computer. The alerts are generated by filtering received information, building information alerts and formatting the alerts into data blocks based upon subscriber preference information. The data blocks are transmitted to the subscriber's wireless device which, when connected to the computer, causes the computer to auto-launch an application to display the information alert and provide access to more detailed information about the information alert. More particularly, the method may comprise providing a viewer application to a subscriber for installation on the remote subscriber computer; receiving information at a transmission server sent from a data source over the Internet, the transmission server comprising a microprocessor and a memory that stores the remote subscriber's preferences for information format, destination address, specified information, and transmission schedule, wherein the microprocessor filters the received information by comparing the received information to the specified information, generates an information alert from the filtered information that contains a name, a price, and a universal resource locator (URL), which specifies the location of the data source; formats the information alert into data blocks according to said information format; and transmits the formatted information alert over a wireless communication channel to a wireless device, associated with a subscriber based upon the destination address and transmission schedule, wherein the alert activates the application to cause the information alert to display on the remote subscriber computer and to enable connection via the URL to the data source over the Internet when the wireless device is locally connected to the remote subscriber computer and the remote subscriber computer comes online.

In various embodiments, the system and method may include a graphical user interface for dynamically relocating/resealing obscured textual information of an underlying window to become automatically viewable to the user. By permitting textual information to be dynamically relocated based on an overlap condition, the computer's ability to display information is improved. More particularly, the method for dynamically relocating textual information within an underlying window displayed in a graphical user interface may comprise displaying a first window containing textual information in a first format within a graphical user interface on a computer screen; displaying a second window within the graphical user interface; constantly monitoring the boundaries of the first window and the second window to detect an overlap condition where the second window overlaps the first window such that the textual information in the first window is obscured from a user's view; determining the textual information would not be completely viewable if relocated to an unobstructed portion of the first window; calculating a first measure of the area of the first window and a second measure of the area of the unobstructed portion of the first window; calculating a scaling factor which is proportional to the difference between the first measure and the second measure; scaling the textual information based upon the scaling factor; automatically relocating the scaled textual information, by a processor, to the unobscured portion of the first window in a second format during an overlap condition so that the entire scaled textual information is viewable on the computer screen by the user; and automatically returning the relocated scaled textual information, by the processor, to the first format within the first window when the overlap condition no longer exists.

In various embodiments, the system may also include isolating and removing malicious code from electronic messages (e.g., email) to prevent a computer from being compromised, for example by being infected with a computer virus. The system may scan electronic communications for malicious computer code and dean the electronic communication before it may initiate malicious acts. The system operates by physically isolating a received electronic communication in a "quarantine" sector of the computer memory. A quarantine sector is a memory sector created by the computer's operating system such that files stored in that sector are not permitted to act on files outside that sector. When a communication containing malicious code is stored in the quarantine sector, the data contained within the communication is compared to malicious code-indicative patterns stored within a signature database. The presence of a particular malicious code-indicative pattern indicates the nature of the malicious code. The signature database further includes code markers that represent the beginning and end points of the malicious code. The malicious code is then extracted from malicious code-containing communication. An extraction routine is run by a file parsing component of the processing unit. The file parsing routine performs the following operations: scan the communication for the identified beginning malicious code marker; flag each scanned byte between the beginning marker and the successive end malicious code marker; continue scanning until no further beginning malicious code marker is found; and create a new data file, by sequentially copying all non-flagged data bytes into the new file, which forms a sanitized communication file. The new, sanitized communication is transferred to a non-quarantine sector of the computer memory. Subsequently, all data on the quarantine sector is erased. More particularly, the system includes a method for protecting a computer from an electronic communication containing malicious code by receiving an electronic communication containing malicious code in a computer with a memory having a boot sector, a quarantine sector and a non-quarantine sector; storing the communication in the quarantine sector of the memory of the computer, wherein the quarantine sector is isolated from the boot and the non-quarantine sector in the computer memory, where code in the quarantine sector is prevented from performing write actions on other memory sectors; extracting, via file parsing, the malicious code from the electronic communication to create a sanitized electronic communication, wherein the extracting comprises scanning the communication for an identified beginning malicious code marker, flagging each scanned byte between the beginning marker and a successive end malicious code marker, continuing scanning until no further beginning malicious code marker is found, and creating a new data file by sequentially copying all non-flagged data bytes into a new the that forms a sanitized communication file; transferring the sanitized electronic communication to the non-quarantine sector of the memory; and deleting all data remaining in the quarantine sector.

In various embodiments, the system may also address the problem of retaining control over customers during affiliate purchase transactions, using a system for co-marketing the look and fear of the host web page with the product-related content information of the advertising merchant's web page. The system can be operated by a third-party outsource provider, who acts as a broker between multiple hosts and merchants. Prior to implementation, a host places links to a merchant's webpage on the host's web page. The links are associated with product-related content on the merchant's web page. Additionally, the outsource provider system stores the "look and feel" Information from each host's web pages in a computer data store, which is coupled to a computer server. The "look and feel" information includes visually perceptible elements such as logos, colors, page layout, navigation system, frames, mouse-over effects or other elements that are consistent through some or all of each host's respective web pages. A customer who clicks on an advertising link is not transported from the host web page to the merchant's web page, but instead is re-directed to a composite web page that combines product information associated with the selected item and visually perceptible elements of the host web page. The outsource provider's server responds by first identifying the host web page where the link has been selected and retrieving the corresponding stored "look and feel" information. The server constructs a composite web page using the retrieved "look and feel" information of the host web page, with the product-related content embedded within it, so that the composite web page is visually perceived by the customer as associated with the host web page. The server then transmits and presents this composite web page to the customer so that she effectively remains on the host web page to purchase the item without being redirected to the third party merchant affiliate. Because such composite pages are visually perceived by the customer as associated with the host web page, they give the customer the impression that she is viewing pages served by the host. Further, the customer is able to purchase the item without being redirected to the third party merchant affiliate, thus allowing the host to retain control over the customer. This system enables the host to receive the same advertising revenue streams as before but without the loss of visitor traffic and potential customers. More particularly, the system may be useful in an outsource provider serving web pages offering commercial opportunities. The computer store containing data, for each of a plurality of first web pages, defining a plurality of visually perceptible elements, which visually perceptible elements correspond to the plurality of first web pages; wherein each of the first web pages belongs to one of a plurality of web page owners; wherein each of the first web pages displays at least one active link associated with a commerce object associated with a buying opportunity of a selected one of a plurality of merchants; and wherein the selected merchant, the outsource provider, and the owner of the first web page displaying the associated link are each third parties with respect to one other; a computer server at the outsource provider, which computer server is coupled to the computer store and programmed to: receive from the web browser of a computer user a signal indicating activation of one of the links displayed by one of the first web pages; automatically identify as the source page the one of the first web pages on which the link has been activated; in response to identification of the source page, automatically retrieve the stored data corresponding to the source page; and using the data retrieved, automatically generate and transmit to the web browser a second web page that displays: information associated with the commerce object associated with the link that has been activated, and the plurality of visually perceptible elements visually corresponding to the source page.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, and C" or "at least one of A, B, or C" is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims.

Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Therefore, the following is claimed:

1. A method, comprising:
 requesting, by a merchant system in electronic communication with a merchant blockchain wallet, a merchant public key and a merchant private key from the merchant blockchain wallet;
 generating, by the merchant system, a smart contract based at least in part on an input regarding a proposed good or service;
 selecting, by the merchant system, the smart contract;
 deploying, by the merchant system, the smart contract to a blockchain;
 registering, by the merchant system, the deployed smart contract with an issuer system, wherein registering further comprises:
  transmitting, by the merchant system in electronic communication with the issuer system, a merchant ID, the merchant public key, and the deployed smart contract to the issuer system to register a merchant-to-smart contract relationship, which links the deployed smart contract with the merchant ID; and
  receiving, by the merchant system in electronic communication with the issuer system, a registration confirmation;
 receiving, from a user device, a request for a transaction to purchase the good or service based on the deployed smart contract, the transaction request comprising a transaction account number;
 transmitting, by the merchant system to the issuer system, a transaction authorization request comprising the merchant ID and the transaction account number; and
 receiving, by the merchant system from the deployed smart contract via the issuer system, a payment receipt, the payment receipt comprising a status of the transaction.

2. The method of claim 1, wherein the transaction authorization request further comprises a transaction amount, and a transaction ID and wherein the issuer system is configured to retrieve the merchant public key based on the merchant ID, the smart contract based on the merchant ID, and a user public key based on the transaction account number, wherein the issuer system is configured to invoke the smart contract by passing the user public key and the transaction ID to the smart contract, and wherein the issuer system is configured to propagate the merchant ID, the transaction account number, a payment amount, and the transaction status to a blockchain network for writing to the blockchain according to an invoked smart contract.

3. The method of claim 2, wherein the invoked smart contract is secured using the merchant private key.

4. The method of claim 2, wherein the merchant public key and the user public key comprise blockchain addresses.

5. The method of claim 1, wherein the smart contract comprises a return policy, a refund policy, a partial payment schedule, a full payment workflow, a service deployment schedule, or a product delivery schedule.

6. The method of claim 1, further comprising receiving the merchant public key.

7. A system comprising:
 a computing device comprising a processor and a memory; and
 machine-readable instructions stored in the memory that, when executed by the processor, cause the computing device to at least:
  request a merchant public key and a merchant private key from a merchant blockchain wallet;
  generate a smart contract based at least in part on an input regarding a proposed good or service;
  select the smart contract;
  deploy the smart contract to a blockchain; and
  register the deployed smart contract with an issuer system, wherein registering further comprises:
   transmit a merchant ID, the merchant public key, and the deployed smart contract to the issuer system to register a merchant-to-smart contract relationship, which links the deployed smart contract with the merchant ID; and
   receive a registration confirmation;
  receive from a user device a request for a transaction to purchase the good or service based on the deployed smart contract, the transaction request comprising a transaction account number;
  transmit to the issuer system, a transaction authorization request comprising the merchant ID and the transaction account number; and
  receive from the deployed smart contract via the issuer system, a payment receipt, the payment receipt comprising a status of the transaction.

8. The system of claim 7, wherein an invoked contract is secured using the merchant private key.

9. The system of claim 7, wherein the transaction authorization request further comprises a transaction amount, and a transaction ID.

10. The system of claim 7, wherein the merchant public key and a user public key comprise blockchain addresses.

11. The system of claim 7, wherein the smart contract comprises a return policy, a refund policy, a partial payment schedule, a full payment workflow, a service deployment schedule, or a product delivery schedule.

12. A non-transitory, computer-readable medium comprising machine-readable instructions that, when executed by a processor of a computing device, cause the computing device to at least:
 request a merchant public key and a merchant private key from a merchant blockchain wallet;
 generate a smart contract based at least in part on an input regarding a proposed good or service;
 select the smart contract;
 deploy the smart contract to a blockchain;
 register the deployed smart contract with an issuer system, wherein registering further comprises:
  transmit a merchant ID, the merchant public key, and the deployed smart contract to the issuer system to register a merchant-to-smart contract relationship, which links the deployed smart contract with the merchant ID; and receive a registration confirmation;

receive from a user device a request for a transaction to purchase the good or service based on the deployed smart contract, the transaction request comprising a transaction account number;

transmit to the issuer system, a transaction authorization request comprising the merchant ID and the transaction account number; and receive from the deployed smart contract via the issuer system, a payment receipt, the payment receipt comprising a status of the transaction.

13. The non-transitory, computer-readable medium of claim 12, wherein an invoked smart contract is secured using the merchant private key.

14. The non-transitory, computer-readable medium of claim 12, wherein the transaction authorization request further comprises a transaction amount, and a transaction ID.

15. The non-transitory, computer-readable medium of claim 12, wherein the merchant public key and a user public key comprise blockchain addresses.

16. The non-transitory, computer-readable medium of claim 12, wherein the smart contract comprises a return policy, a refund policy, a partial payment schedule, a full payment workflow, a service deployment schedule, or a product delivery schedule.

* * * * *